Jan. 27, 1942.　　　H. J. CAMERON　　　2,270,930
PRODUCTION OF PURIFIED CYCLORUBBER DERIVATIVES
Filed Feb. 20, 1939
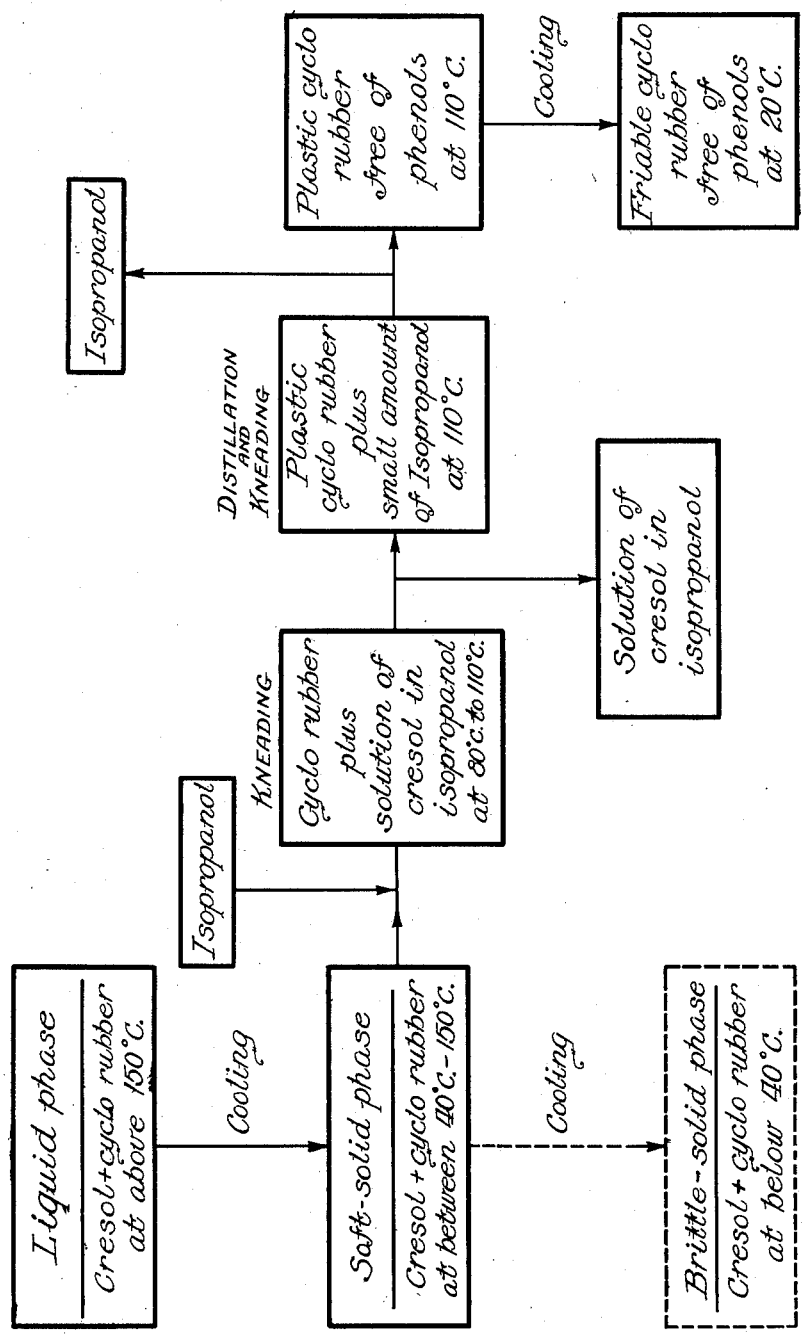
INVENTOR.
Hugh J. Cameron
BY Gabel, Carlson, Gutzbaugh
and Wells
ATTORNEYS.

Patented Jan. 27, 1942

2,270,930

UNITED STATES PATENT OFFICE 2,270,930

PRODUCTION OF PURIFIED CYCLORUBBER DERIVATIVES

Hugh J. Cameron, Gary, Ind., assignor to Marbon Corporation, Gary, Ind., a corporation of Delaware Application February 20, 1939, Serial No. 257,406

2 Claims. (Cl. 260—768)

The invention relates to the preparation of purified products and includes a process of removing impurities from normally friable resinous material. More particularly the invention relates to the preparation of cyclorubber and includes a process of extracting phenolic material from the normally friable cyclized rubber product obtained by the treatment of rubber with a phenol and an acid catalyst at temperatures sufficient to bring about a cyclizing reaction.

In the application of James P. McKenzie, Serial No. 180,833, filed December 20, 1937, there is described a process of obtaining a resinous gasoline-soluble polycyclorubber having the general structure $(C_5H_8)_x$ in which more carbon atoms are directly connected than in rubber. In one example of producing such a cyclized rubber product a mass of 24 parts by weight of pale crepe rubber is heated in the presence of hydrochloric acid in a bath of 32 parts by weight of cresol at a temperature of 190° C. for about two hours. The resulting product at this temperature is homogeneous liquid, apparently a solution of the cyclorubber in the cresol. On cooling this product, the major proportion of the cresol is precipitated from the rubber derivative at some temperature between 100 to 150° C. and remains the dispersed phase of a solid solution. It seems apparent that there is a slight solubility of the cyclorubber in the cresol and a somewhat greater solubility of the cresol in the rubber derivative. On further cooling the reaction product to below 40° C. it becomes friable, will readily fracture and may be ground to a fine powder. In the extraction process as described in the McKenzie application, the reaction mass is ground at approximately room temperature to a powder and washed with methanol to remove the cresol and isolate the resin-like hydrocarbon.

It has been found that this method of extraction is not commercially suitable when the complete removal of phenolic material from resin-like hydrocarbon is desired. Since these resin-like hydrocarbons and their derivatives are used as a coating material which may be exposed to foodstuffs and since even traces of phenolic material impart an odor to foodstuffs, it is of prime importance to efficiently and economically remove all phenolic material from the resin-like hydrocarbon.

In accordance with this invention phenolic substances are completely and economically removed even to traces without detrimentally effecting the cyclorubber. This is accomplished by maintaining the temperature of reaction product at a temperature sufficiently above room temperature so that the reaction product is in the state of a coherent plastic mass (instead of the normally friable brittle mass), while kneading or masticating the plastic mass in the presence of a solvent extraction medium such as, for example, one of the lower alcohols. By the kneading action the cresol is released in exactly the same fashion as buttermilk is removed from butter by kneading. In the presence of the solvent medium the phenol is dissolved as it is released by the kneading action.

It has been found desirable to use as an extraction medium for the phenol-rubber reaction product one of the lower alcohols boiling below 100° C. Under such circumstances the mastication and washing is carried out in a closed container under some pressure greater than atmospheric. Such a closed container may suitably be one of the conventional closed type of "dough mixers." This type of machine is likewise adapted to facilitate the partial or complete removal of that portion of the washing liquid which is trapped by the plastic mass. Continuous mastication with the application of either heat or vacuum or both accomplishes this.

The plastic mass produced in this manner may be removed from the machine with not more than 5% of dispersed alcohols.

The solvent used to extract the phenols and other impurities from the reaction product, continuously or intermittently, is replaced by fresh solvent until the remaining product is entirely free from soluble impurities.

To more clearly set forth the practice in accordance with the invention and to more specifically point out the nature of the product and process contemplated thereby, a specific, illustrative example is hereinafter set forth, reference being had to the accompanying drawing in which a diagrammatic flow sheet of a preferred embodiment of the invention is shown.

Example I

The product created by heating a mixture of 12 parts by weight of crepe rubber and 16 parts of a commercial cresol in the presence of HCl gas at 200° C. is charged into a kneading type internal mixer at about 80° C.

The lid is then bolted to the mixer and about ten parts of isopropanol introduced by means of a pressure pump.

Hot oil is circulated through the jacket of the mixer in order to maintain a suitable consistency in the mass of material being washed.

After five minutes operation of the mixer, the solution of phenol and alcohol is drawn off through a cooling coil.

A fresh charge of ten pounds of isopropanol is then introduced and the operation repeated.

A repetition of this operation ten times is sufficient to reduce the phenol content of the solid hydrocarbon below five parts in 10,000.

The residual product which is in the form of an expanded sponge-like mass when the mastication action is stopped, usually contains about twenty percent of isopropanol. The alcohol is removed by distillation, preferably at atmospheric pressure, sufficient heat being generated by the mastication action and by absorption from the jacket to volatilize the alcohol. During the distillation the masticating action is continued. The alcohol content is reduced by distillation to about 1% to 5%, but preferably is not made lower than 1% since otherwise difficulty is encountered in removal of the residual rubber derivative from the mixer.

It will be understood that other phenols than the cresols may be readily removed by the process of the invention. Phenol (carbolic acid), carvacrol, naphthols, catechol, parachlorophenol, and mixtures of phenols such as commercial cresol, cresylic acid, and any of the solvent extractable phenolic compounds are quickly and economically recovered.

Likewise other solvent extraction media than isopropanol may be used. As a solvent extraction media is contemplated any solvent for the phenol or other impurity present which is not a solvent for the cyclorubber or other thermoplastic product desired to be purified. When the impurity is soluble in water, as in the case with ordinary phenol, water may be used as the extraction medium. In the example described above and illustrated in the drawing, similar results are obtained when phenol (carbolic acid) is substituted for cresol and water for isopropanol. Ordinarily, however, for extracting phenols from the polycyclorubber compositions obtained from phenols and acidifying substances, it is preferred to use one of the lower alcohols such as methanol, ethanol, propyl and butyl alcohols.

The process of this invention is of advantage in extracting impurities from any normally brittle substance which is capable of being made plastic by heat. It is, however, of particular value in extracting phenolic and other soluble impurities from the normally friable hydrocarbon conversion products of rubber obtained by heating rubber with cyclizing agents. These substances are not only very difficult and expensive to purify but are susceptible to changes, such as reduction in viscosity, oxidation, etc., during treatment. By the process of this invention such changes in character may be readily eliminated or controlled within narrow limits, while by prior art distillation and precipitation methods control is difficult and expensive, if not impossible of practical attainment.

While there have been shown and described certain embodiments of the invention, it is to be understood that it is capable of many modifications. Changes, therefore, may be made without departing from the spirit and scope of the invention as described in the appended claims, in which it is the intention to claim all novelty inherent in the invention as broadly as possible, in view of the prior art.

I claim:

1. The method of obtaining a highly purified cyclorubber which comprises subjecting rubber to heat in a bath of a phenol in the presence of a cyclizing agent for a time and temperature such that a composition is obtained comprising phenol and a cyclorubber, admixing said composition of cyclorubber and phenol with a solvent for the phenol which is substantially a non-solvent for the cyclorubber, kneading the mixture so obtained at a temperature such that cyclorubber is a plastic coherent mass whereby entrapped phenol is released and dissolves in the solvent, and removing the phenol-containing solvent from the mixture.

2. The method of obtaining a highly purified cyclorubber which comprises subjecting rubber to heat in a bath of cresol in the presence of hydrogen chloride for a time and temperature such that a substantially homogeneous liquid is obtained comprising a solution of a cyclorubber in hot cresol, said cyclorubber being of a type which is a friable resin at normal room temperature, admixing said composition of cyclorubber and phenol with an aliphatic alcohol of a type which is a solvent for the cresol and substantially a non-solvent for the cyclorubber, kneading the mixture so obtained at a temperature above normal room temperature and such that said normally friable cyclorubber is a plastic coherent mass, whereby entrapped phenol is released and dissolves in the alcohol, and withdrawing the phenol-containing alcohol from the mixture.

HUGH J. CAMERON.